United States Patent
Shintani et al.

(10) Patent No.: US 10,979,695 B2
(45) Date of Patent: Apr. 13, 2021

(54) GENERATING 3D DEPTH MAP USING PARALLAX

(71) Applicants: SONY CORPORATION, Tokyo (JP); Sony Interactive Entertainment Inc., Tokyo (JP)

(72) Inventors: Peter Shintani, San Diego, CA (US); Morio Usami, Tokyo (JP); Kazuyuki Shikama, Tokyo (JP); Keith Resch, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/653,985

(22) Filed: Oct. 15, 2019

(65) Prior Publication Data
US 2020/0053346 A1    Feb. 13, 2020

Related U.S. Application Data

(62) Division of application No. 15/798,914, filed on Oct. 31, 2017, now Pat. No. 10,484,667.

(51) Int. Cl.
| | |
|---|---|
| *H04N 13/271* | (2018.01) |
| *G01S 17/89* | (2020.01) |
| *G06T 7/55* | (2017.01) |
| *G06T 15/20* | (2011.01) |
| *G06F 3/01* | (2006.01) |
| *G06F 3/0488* | (2013.01) |
| *H04N 13/128* | (2018.01) |
| *H04N 13/25* | (2018.01) |

(Continued)

(52) U.S. Cl.
CPC .......... *H04N 13/271* (2018.05); *G01S 17/89* (2013.01); *G06F 3/017* (2013.01); *G06F 3/04883* (2013.01); *G06T 5/50* (2013.01); *G06T 7/55* (2017.01); *G06T 7/593* (2017.01); *G06T 15/205* (2013.01); *H04N 13/128* (2018.05); *H04N 13/25* (2018.05); *G06T 2207/10028* (2013.01)

(58) Field of Classification Search
CPC .... H04N 13/271; H04N 13/128; H04N 13/25; G06T 7/55; G06T 7/593; G06T 5/50; G06T 15/205; G01S 17/89; G06F 3/017; G06F 3/04883
USPC .......................................................... 715/863
See application file for complete search history.

(56) References Cited

U.S. PATENT DOCUMENTS

| | | |
|---|---|---|
| 5,228,069 A | 7/1993 | Arenson et al. |
| 6,291,816 B1 | 9/2001 | Liu |

(Continued)

FOREIGN PATENT DOCUMENTS

| | | |
|---|---|---|
| EP | 2225699 A1 | 9/2010 |
| EP | 2730939 A2 | 5/2014 |
| EP | 2339532 B1 | 4/2015 |

OTHER PUBLICATIONS

Shintani et al., "3D Depth Map", related U.S. Appl. No. 15/590,497, Applicant's response to Non-Final Office Action filed Jan. 21, 2020.

(Continued)

*Primary Examiner* — William D Titcomb
(74) *Attorney, Agent, or Firm* — John L. Rogitz

(57) ABSTRACT

Parallax views of objects are used to generate 3D depth maps of the objects using time of flight (TOF) information. In this way, the deleterious effects of multipath interference can be reduced to improve 3D depth map accuracy without using computationally intensive algorithms.

20 Claims, 6 Drawing Sheets

(51) Int. Cl.
*G06T 5/50* (2006.01)
*G06T 7/593* (2017.01)

(56) References Cited

U.S. PATENT DOCUMENTS

| | | | |
|---|---|---|---|
| 6,420,698 B1 | 7/2002 | Dimsdale | |
| 6,442,465 B2 | 8/2002 | Breed et al. | |
| 6,664,501 B1 | 12/2003 | Troitski | |
| 6,970,183 B1 | 11/2005 | Monroe | |
| 7,184,088 B1 | 2/2007 | Ball | |
| 7,262,854 B2 | 8/2007 | Imura | |
| 7,752,483 B1 | 7/2010 | Muresan et al. | |
| 7,791,009 B2 | 9/2010 | Johnston et al. | |
| 8,730,309 B2 | 5/2014 | Wilson et al. | |
| 8,780,113 B1 | 7/2014 | Ciurea et al. | |
| 8,803,950 B2 | 8/2014 | Ren et al. | |
| 8,824,827 B2 | 9/2014 | Quan et al. | |
| 8,830,555 B2 | 9/2014 | Aksamit et al. | |
| 9,031,356 B2 | 5/2015 | Kunkel et al. | |
| 9,098,908 B2 | 8/2015 | Kirk et al. | |
| 9,214,492 B2 | 12/2015 | Tempel et al. | |
| 9,235,928 B2 | 1/2016 | Medioni et al. | |
| 9,262,691 B2 | 2/2016 | Kang et al. | |
| 9,275,302 B1 | 3/2016 | Yan et al. | |
| 9,286,694 B2 | 3/2016 | Kim et al. | |
| 9,319,139 B2 | 4/2016 | Effenberger et al. | |
| 9,405,008 B2 | 8/2016 | Raskar et al. | |
| 9,426,450 B1 | 8/2016 | Zhang et al. | |
| 9,435,891 B2 | 9/2016 | Oggier | |
| 9,483,835 B2 | 11/2016 | Liang et al. | |
| 9,542,749 B2 | 1/2017 | Freedman et al. | |
| 9,557,166 B2 | 1/2017 | Thuries et al. | |
| 9,618,613 B2 | 4/2017 | Murakami et al. | |
| 9,760,837 B1 | 9/2017 | Nowozin et al. | |
| 9,806,813 B2 | 10/2017 | Liu et al. | |
| 9,858,673 B2 | 1/2018 | Ciurea et al. | |
| 9,860,618 B2 | 1/2018 | Liu et al. | |
| 9,995,578 B2 | 6/2018 | Ge et al. | |
| 10,068,373 B2* | 9/2018 | Lee | G06F 3/04815 |
| 10,142,612 B2 | 11/2018 | Ge et al. | |
| 10,559,127 B2 | 2/2020 | Wei et al. | |
| 10,650,542 B2 | 5/2020 | Lee | |
| 2003/0198377 A1* | 10/2003 | Ng | G06T 7/593 |
| | | | 382/154 |
| 2004/0141170 A1 | 7/2004 | Jamieson et al. | |
| 2004/0141753 A1 | 7/2004 | Euw et al. | |
| 2004/0208272 A1 | 10/2004 | Moursund et al. | |
| 2005/0031166 A1 | 2/2005 | Fujimura et al. | |
| 2005/0117215 A1* | 6/2005 | Lange | G06T 15/04 |
| | | | 359/462 |
| 2005/0207755 A1 | 9/2005 | Rabbat et al. | |
| 2005/0226214 A1 | 10/2005 | Keslassy et al. | |
| 2006/0066612 A1* | 3/2006 | Yang | G06T 15/205 |
| | | | 345/419 |
| 2006/0203335 A1* | 9/2006 | Martin | H04N 13/133 |
| | | | 359/462 |
| 2006/0221241 A1 | 10/2006 | Okumichi et al. | |
| 2006/0239558 A1 | 10/2006 | Rafii et al. | |
| 2007/0024614 A1 | 2/2007 | Tam et al. | |
| 2007/0279415 A1 | 12/2007 | Sullivan et al. | |
| 2008/0152247 A1 | 6/2008 | Oh et al. | |
| 2009/0080885 A1 | 3/2009 | Mehrotra et al. | |
| 2009/0153652 A1* | 6/2009 | Barenbrug | H04N 13/122 |
| | | | 348/54 |
| 2009/0190853 A1 | 7/2009 | Noh | |
| 2010/0231689 A1* | 9/2010 | Bruls | H04N 19/00 |
| | | | 348/43 |
| 2010/0302365 A1 | 12/2010 | Finocchio et al. | |
| 2010/0316284 A1* | 12/2010 | Jeong | G06T 5/002 |
| | | | 382/162 |
| 2011/0025843 A1 | 2/2011 | Oggier et al. | |
| 2011/0142138 A1* | 6/2011 | Tian | H04N 19/61 |
| | | | 375/240.24 |
| 2011/0188773 A1 | 8/2011 | Wei et al. | |
| 2011/0243570 A1 | 10/2011 | Kim et al. | |
| 2012/0032833 A1 | 2/2012 | Milligan et al. | |
| 2012/0044476 A1 | 2/2012 | Earhart et al. | |
| 2012/0056982 A1 | 3/2012 | Katz et al. | |
| 2012/0069009 A1 | 3/2012 | Shimoyama et al. | |
| 2012/0168605 A1 | 7/2012 | Milanovic et al. | |
| 2012/0182394 A1 | 7/2012 | Bae et al. | |
| 2012/0248514 A1 | 10/2012 | Korekado et al. | |
| 2012/0249544 A1 | 10/2012 | Maciocci et al. | |
| 2012/0293615 A1 | 11/2012 | Chen et al. | |
| 2012/0306876 A1 | 12/2012 | Shotton et al. | |
| 2013/0051516 A1 | 2/2013 | Yang et al. | |
| 2013/0129224 A1 | 5/2013 | Katz et al. | |
| 2013/0195083 A1 | 8/2013 | Kim et al. | |
| 2013/0207970 A1 | 8/2013 | Shpunt et al. | |
| 2013/0278604 A1 | 10/2013 | Georgis et al. | |
| 2013/0293684 A1 | 11/2013 | Becker et al. | |
| 2013/0329012 A1 | 12/2013 | Bartos et al. | |
| 2014/0058367 A1 | 2/2014 | Dantus | |
| 2014/0079288 A1 | 3/2014 | Lee et al. | |
| 2014/0092221 A1 | 4/2014 | Nagai | |
| 2014/0168424 A1 | 6/2014 | Attar et al. | |
| 2014/0198977 A1 | 7/2014 | Narasimha et al. | |
| 2014/0226984 A1 | 8/2014 | Roberts et al. | |
| 2014/0240467 A1 | 8/2014 | Petyushko et al. | |
| 2014/0253679 A1 | 9/2014 | Guigues et al. | |
| 2014/0253691 A1 | 9/2014 | Holz | |
| 2014/0267234 A1 | 9/2014 | Hook et al. | |
| 2014/0267243 A1* | 9/2014 | Venkataraman | H04N 13/106 |
| | | | 345/419 |
| 2014/0267633 A1* | 9/2014 | Venkataraman | G01P 3/38 |
| | | | 348/48 |
| 2014/0293993 A1 | 10/2014 | Ryhorchuk | |
| 2014/0323148 A1 | 10/2014 | Schmalstieg et al. | |
| 2014/0333728 A1 | 11/2014 | Navab et al. | |
| 2014/0355901 A1 | 12/2014 | Tezaur | |
| 2014/0375851 A1 | 12/2014 | Lee et al. | |
| 2014/0376768 A1 | 12/2014 | Troy et al. | |
| 2015/0002636 A1 | 1/2015 | Brown | |
| 2015/0022643 A1 | 1/2015 | Stetson et al. | |
| 2015/0024336 A1 | 1/2015 | Blassnig et al. | |
| 2015/0036926 A1 | 2/2015 | Choi et al. | |
| 2015/0070489 A1 | 3/2015 | Hudman et al. | |
| 2015/0130903 A1 | 5/2015 | Thompson et al. | |
| 2015/0130904 A1 | 5/2015 | Bae et al. | |
| 2015/0171968 A1 | 6/2015 | Featherston et al. | |
| 2015/0172626 A1* | 6/2015 | Martini | G06K 9/46 |
| | | | 348/50 |
| 2015/0248765 A1 | 9/2015 | Criminisi et al. | |
| 2015/0254811 A1 | 9/2015 | Sahu et al. | |
| 2015/0294686 A1 | 10/2015 | Autioniemi | |
| 2015/0309663 A1 | 10/2015 | Seo et al. | |
| 2015/0339471 A1 | 11/2015 | Bennett et al. | |
| 2015/0371393 A1 | 12/2015 | Ramachandra et al. | |
| 2015/0373322 A1 | 12/2015 | Goma et al. | |
| 2015/0378023 A1 | 12/2015 | Royo et al. | |
| 2016/0012633 A1 | 1/2016 | Wei et al. | |
| 2016/0097851 A1 | 4/2016 | Zhang et al. | |
| 2016/0098847 A1 | 4/2016 | Crnokrak | |
| 2016/0099777 A1 | 4/2016 | Liu et al. | |
| 2016/0124089 A1 | 5/2016 | Meinherz et al. | |
| 2016/0173869 A1* | 6/2016 | Wang | G06T 5/50 |
| | | | 348/187 |
| 2016/0191759 A1 | 6/2016 | Somanath et al. | |
| 2016/0239725 A1 | 8/2016 | Liu et al. | |
| 2016/0283774 A1 | 9/2016 | Buchanan et al. | |
| 2016/0291160 A1 | 10/2016 | Zweigle et al. | |
| 2016/0307367 A1 | 10/2016 | Chuang et al. | |
| 2016/0325753 A1* | 11/2016 | Stein | G06K 9/46 |
| 2016/0328828 A1 | 11/2016 | Zhang et al. | |
| 2016/0344967 A1 | 11/2016 | Barnes et al. | |
| 2017/0061701 A1 | 3/2017 | Mittal et al. | |
| 2017/0188017 A1 | 6/2017 | Hall | |
| 2017/0201738 A1 | 7/2017 | Lacaze et al. | |
| 2017/0213356 A1 | 7/2017 | Park | |
| 2017/0264880 A1* | 9/2017 | Zolotov | G06T 7/10 |
| 2017/0277180 A1 | 9/2017 | Baer et al. | |
| 2017/0280125 A1 | 9/2017 | Brown et al. | |
| 2017/0332750 A1 | 11/2017 | Gharabegian | |
| 2017/0372527 A1 | 12/2017 | Murali et al. | |

(56) References Cited

U.S. PATENT DOCUMENTS

| | | |
|---|---|---|
| 2017/0374342 A1 | 12/2017 | Zhao |
| 2018/0033357 A1 | 2/2018 | Li et al. |
| 2018/0034579 A1 | 2/2018 | Liu et al. |
| 2018/0053284 A1 | 2/2018 | Rodriguez et al. |
| 2018/0100928 A1 | 4/2018 | Keilaf et al. |
| 2018/0124371 A1 | 5/2018 | Kamal et al. |
| 2018/0173990 A1 | 6/2018 | Shintani et al. |
| 2018/0176483 A1 | 6/2018 | Knorr et al. |
| 2018/0190014 A1 | 7/2018 | Yarborough et al. |
| 2018/0234617 A1 | 8/2018 | Przyborski |
| 2018/0270465 A1* | 9/2018 | Bendall .............. G01N 21/8851 |
| 2018/0309970 A1* | 10/2018 | Gupta ................... G01S 17/894 |

OTHER PUBLICATIONS

Shintani et al., "3D Depth Map", related U.S. Appl. No. 15/590,497, Non-Final Office Action dated Jan. 10, 2020.

Shintani et al., "3D Depth Map", related U.S. Appl. No. 15/590,497, Applicant's response to Non-Final Office Action filed May 27, 2020.

Shintani et al., "3D Depth Map", related U.S. Appl. No. 15/590,497, Non-Final Office Action dated May 19, 2020.

Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.

Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.

He et al, "Iterative Transduction Learning for Automatic Image Segmentation and Matting with RGB-D Data", Elsevier, Mar. 2014.

Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.

Jang et al, "Depth Map Generation Using a Single Image Sensor with Phase Masks", Chang-Ang University, Seoul, South Korea, Jun. 2016.

Jinbeum Jang, Sangwoo Park, Jieun Jo, Joonki Paik, "Depth map generation using a single image sensor with phase masks", Image Processing and Intelligent System Laboratory Graduate School of Advanced Imaging Science and Film, Chung-Ang University, Seoul, South Korea, Optical Society of America, 2016.

Kim et al, "Multi-focusing and Depth Estimation Using a Color Shift Model-Based Computational Camera", IEEE Transactions on Image Processing, vol. 21, No. 9, Sep. 2012.

Li et al, "Brain-Inspired Framework for Fusion of Multiple Depth Cues", IEEE Transactions on Circuits and Systems for Video Technology, vol. 23, No. 7, Jul. 2013.

Nathan Silberman, Rob Fergus, "Indoor Scene Segmentation using a Structured Light Sensor", Dept. of Computer Science, Nov. 6, 2011, Courant Institute, New York University, pp. 601-608.

Quang H. Nguyen, Minh N. Do, Sanjay J. Patel, "Depth image-based rendering from multiple cameras with 3D propagation algorithm", May 27, 2009.

Riegler et al., "A Deep Primal-Dual Network for Guided Depth Super-Resolution", Institute for Computer Graphics and Vision, Graz University of TechnologyAustria, Jul. 28, 2016.

Roy et al, "Denoising 3D Models with Attributes Using Soft Thresholding", Bourgogne University, France, 2004.

Schuon et al., "High-Quality Scanning Using Time-of-Flight Depth Superresolution", Stanford University, 2008.

Shuran Song, Jianxiong Xiao, "Sliding Shapes for 3D Object Detection in Depth Images", Abstract, Sep. 2014.

Yo-Sung Ho, Yun-Suk Kang, "Multi-View Depth Generation using Multi-Depth Camera System", Gwangju Institute of Science and Technology, Jan. 4, 2016.

Taylor et al., "Multipoint Slam Capture", file history of related U.S. Appl. No. 16/780,858, filed Feb. 3, 2020.

\* cited by examiner

GENERATING 3D DEPTH MAP USING PARALLAX

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to map their environment. As understood herein, three-dimensional (3D) depth maps may be generated by each device of the other devices or objects within line of sight. Such 3D depth maps are generated typically using "time of flight" principles, i.e., by timing the periods from laser transmission to reception of each reflection, with regions of an object further away taking longer for the light to propagate to it and then return to a detector. The time of flight for each detected reflection by a sensor, typically a complementary metal oxide semiconductor (CMOS) camera, is converted to distance to generate the depth map.

As understood herein, a problem with time of flight 3D camera mapping systems is signal noise owing to multipath interference. Objects such as the surface the object being mapped is on, walls, the floor, the ceiling, and objects nearby the object being mapped can contribute to reflections that are received and thus interfere with computing the 3D depth map of the object sought to be mapped. Computationally intensive algorithms have been introduced to reduce the effect of multipath on a TOF 3D depth mapping system, but present principles seek to avoid the use of such algorithms and their concomitant processing and power consumption demands.

SUMMARY

To reduce the effect of multipath noise in a 3D depth map system, such as from a Lambertian surface or from environmental conditions (e.g., highly reflective walls or ceilings), a 3D depth map system employs assumptive rules to allow non-mathematical techniques to be used to reduce the effect of multipath and hence improve the 3D depth mapping accuracy. If the spatial location of the object being mapped is known, the position of the TOF system can be shifted in one or more axes, to create an additional view which produces parallax relative to the initial view. This additional view is used to create an additional 3D depth map, which is different from the 3D depth map generated in the initial view owing to parallax (the different angles from which the TOF data is generated). Because the object being measured is the same, object recognition may be used to filter extraneous data from the two views, or the less "noisy" of the two views is used. Another assumption which permits this sequential viewing of the object is that the objects are not moving very fast relative the speed of the TOF captures.

If the error in the depth map is large, then one could assume that the reflective path that created that long path would be likely due to a wall or ceiling reflection. If it was shorter it may be from the floor or supporting surface. After a little "learning" the system would be able to quickly catalog the range of reflections due to either a wall, or ceiling or floor. Hence the system would know which axis to shift to reduce the dominant reflections.

Accordingly, a device includes a computer medium that is not a transitory signal and that includes instructions executable by a processor to receive at least a first camera image of at least one object from a first image generation location. The instructions are executable to receive at least a camera image of the at least one object from a second image generation location. The first and second image generation locations render parallax views of the object. The instructions are executable to use the first and second camera images to render a three-dimensional (3D) depth map.

In examples, the representations are two-dimensional (2D) images of the object. Or, the representations can be a three-dimensional (3D) depth map of the object.

In some examples, the instructions can be executable to establish the second image generation location by translationally moving an imaging object supporting a camera generating the images. In other examples, the instructions can be executable to establish the second image generation location by moving a camera relative to an imaging object supporting the camera.

In a non-limiting embodiment, the instructions are executable to use the first and second camera images to render a three-dimensional (3D) depth map by consolidating the first and second camera images. In another embodiment, the instructions are executable to use the first and second camera images to render a three-dimensional (3D) depth map by determining which of the first and second camera images exhibits less noise, and using the image exhibiting less noise to establish the 3D depth map.

In another aspect, an assembly includes plural computerized devices. Each computerized device includes at least one laser emitter configured to output signals useful for generating at least one three-dimensional (3D) depth map. A first one of the computerized devices is programmed with instructions to generate an initial two-dimensional (2D) camera image and an initial laser-based time of flight (TOF) image of a target object. The instructions are executable to move a camera generating the initial laser-based TOF image of the target object, generate a secondary laser-based TOF image of the target object, and use the initial laser-based TOF image of the target object and secondary laser-based TOF image of the target object to generate a 3D depth map of the target object.

In another aspect, a method includes generating an initial image of a target object using a camera, moving the camera to a parallax view of the target object, and generating a secondary image of the target object using the camera. Based on the initial and secondary images, the method includes generating a three-dimensional (3D) depth map of the target object.

The details of the present application, both as to its structure and operation, can be best understood in reference to the accompanying drawings, in which like reference numerals refer to like parts, and in which:

DETAILED DESCRIPTION

Figure 1:
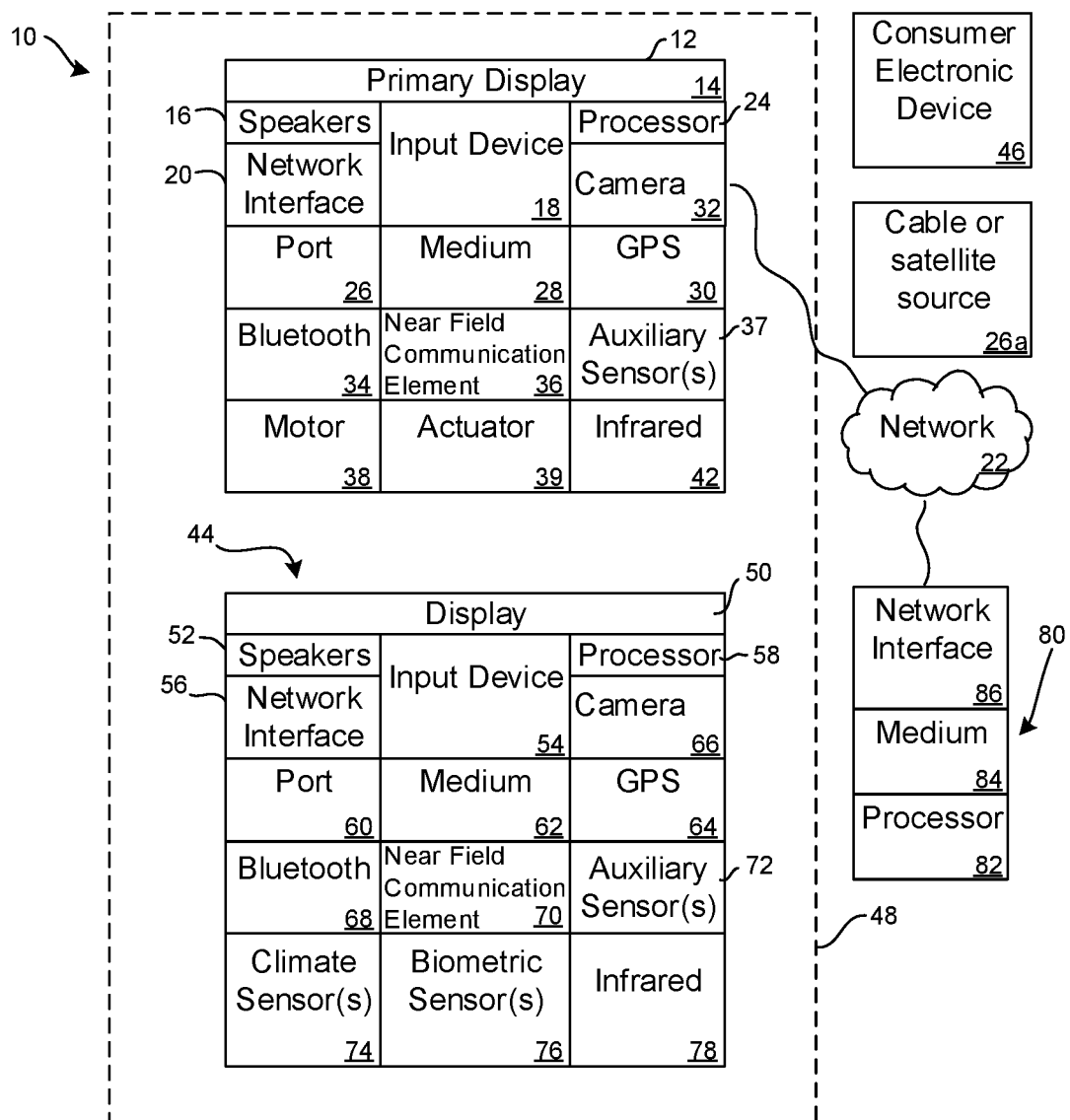
FIG. 1 is a block diagram of an example device.

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a UNIX operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid-state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
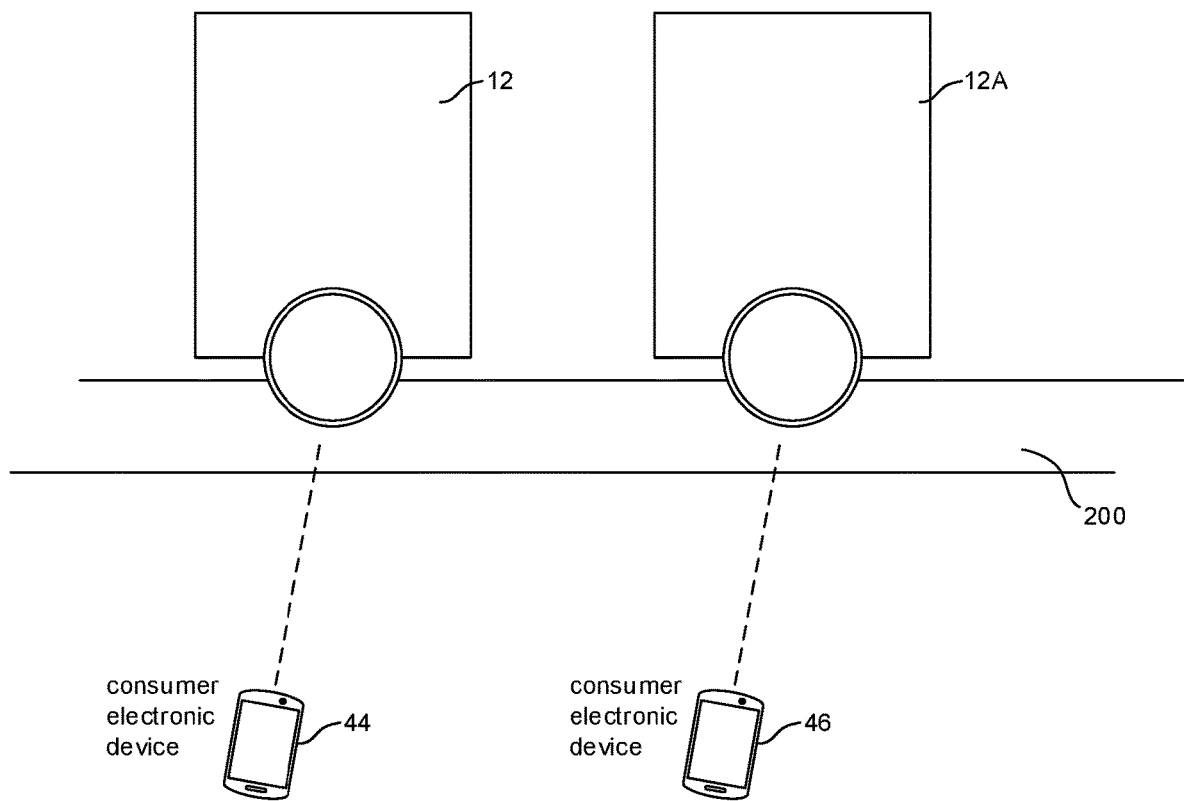
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
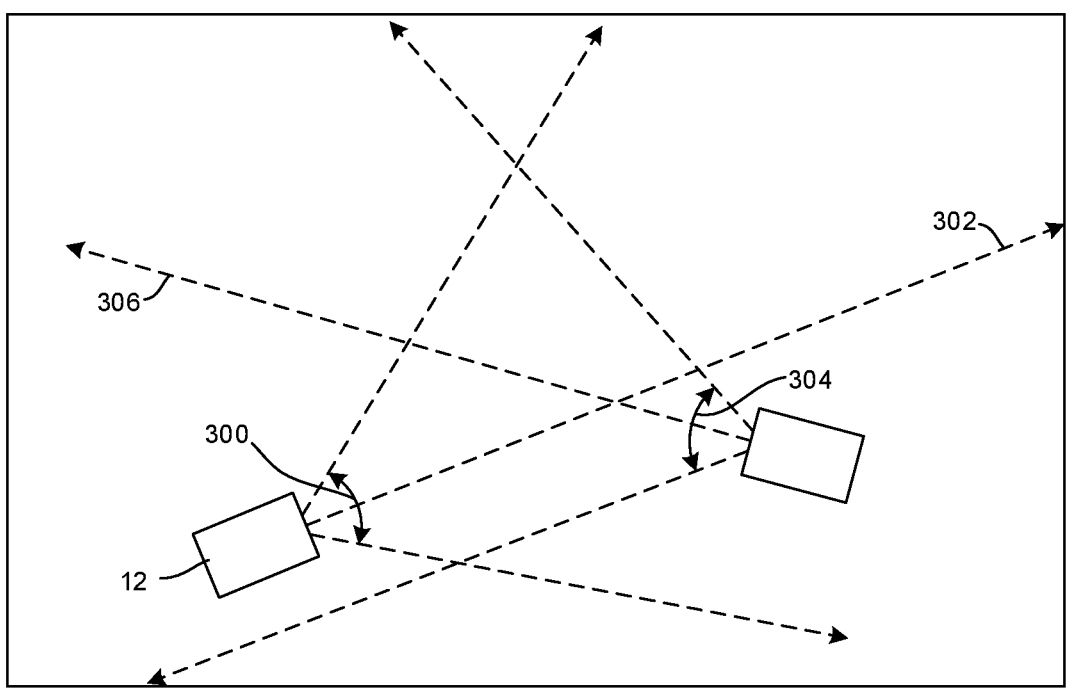
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map. The depth map subsequently may be used for object recognition, for navigation to avoid striking objects in the depth map, and so on.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown. The devices 12, 12A emitting their respective laser beams establish an optical micro-mesh.

Figure 4:
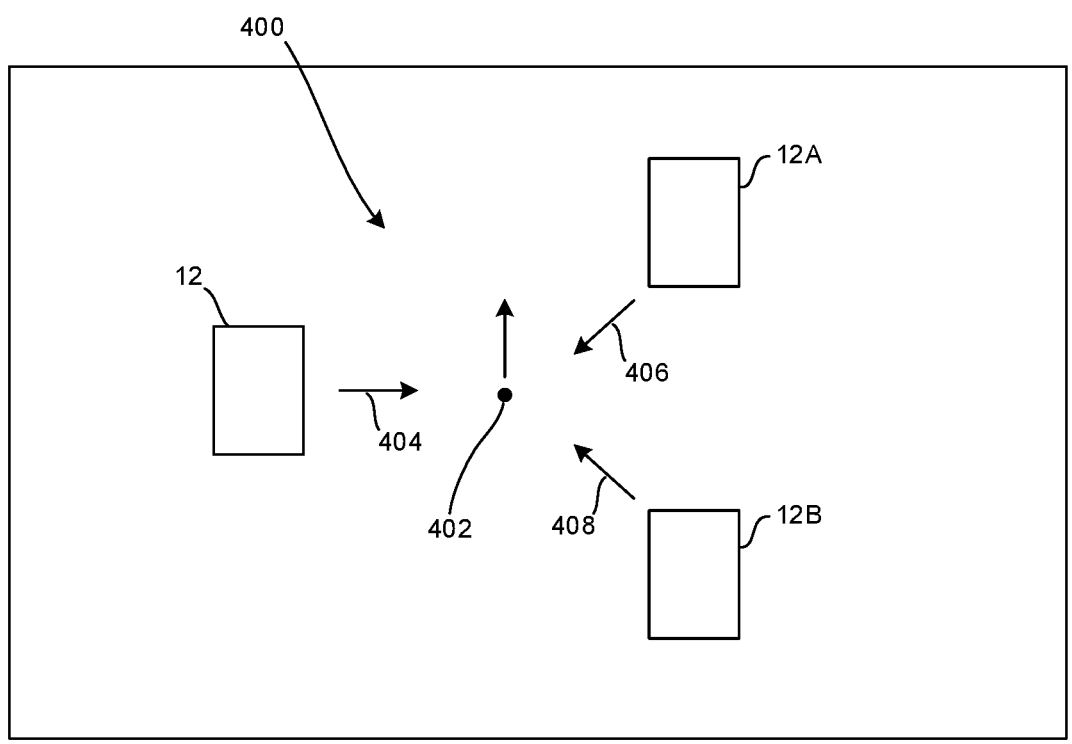
FIG. 4 is a schematic top view of three devices.

FIG. 4 illustrates a system 400 with three devices 12, 12A, 12B implemented by any of the devices described herein. Each device may generate its own depth map by imaging the other devices within its field of view. The depth maps can be aggregated together for a reference location that may be user-defined. In the example shown, a reference location 402 is located centrally in the system 400. Other reference locations may be modeled, including using one of the devices 12, 12A, 12B as a reference location. For description purposes, assume that the arrows 404, 406, 408 respectively represent the centerline axis of the field of view of each device 12, 12A, 12B.

Figure 5:
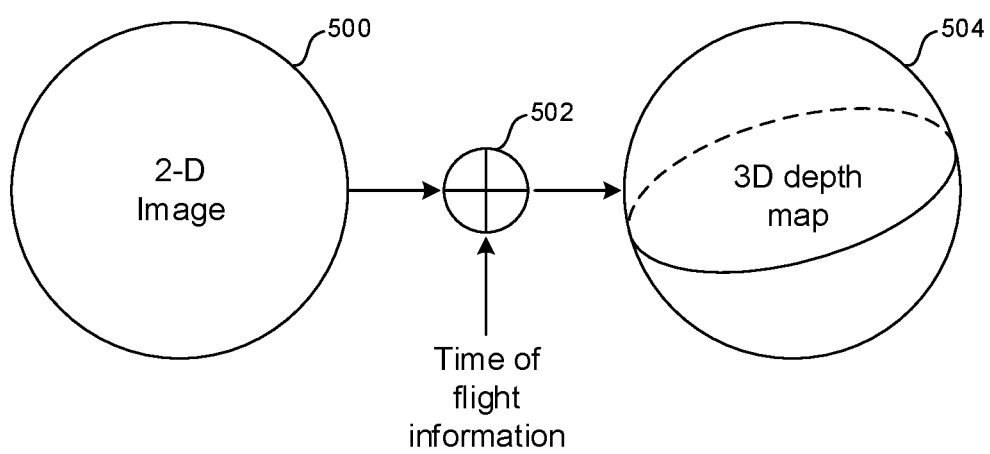
FIG. 5 schematically illustrates deriving a 3D depth map using time of flight (TOF) information combined with a 2D image from a camera.

FIG. 5 illustrates that an object such as a sphere may be imaged using a laser, with a 2D image 500 of the object being captured by a camera such as any of those discussed above. At 502 the 2D image 500 is combined with TOF information, e.g., on a pixel-by-pixel basis, to render a 3D depth map of the object, illustrated by the sphere 504.

As a non-limiting example, a laser can be pulsed to cause light to impinge on the object and be reflected back to an imager to establish a pixel of the 2D image 500. The TOF information for that pixel is associated with the pixel in a data structure. Then the laser can be pulsed again to cause light to impinge on the object and be reflected back to the imager to establish a second pixel of the 2D image 500. The TOF information for that second pixel is associated with the second pixel in a data structure, and so on, until the pixels of the 2D image have been established along with corresponding TOF information for generating the 3D depth map.

Figure 6:
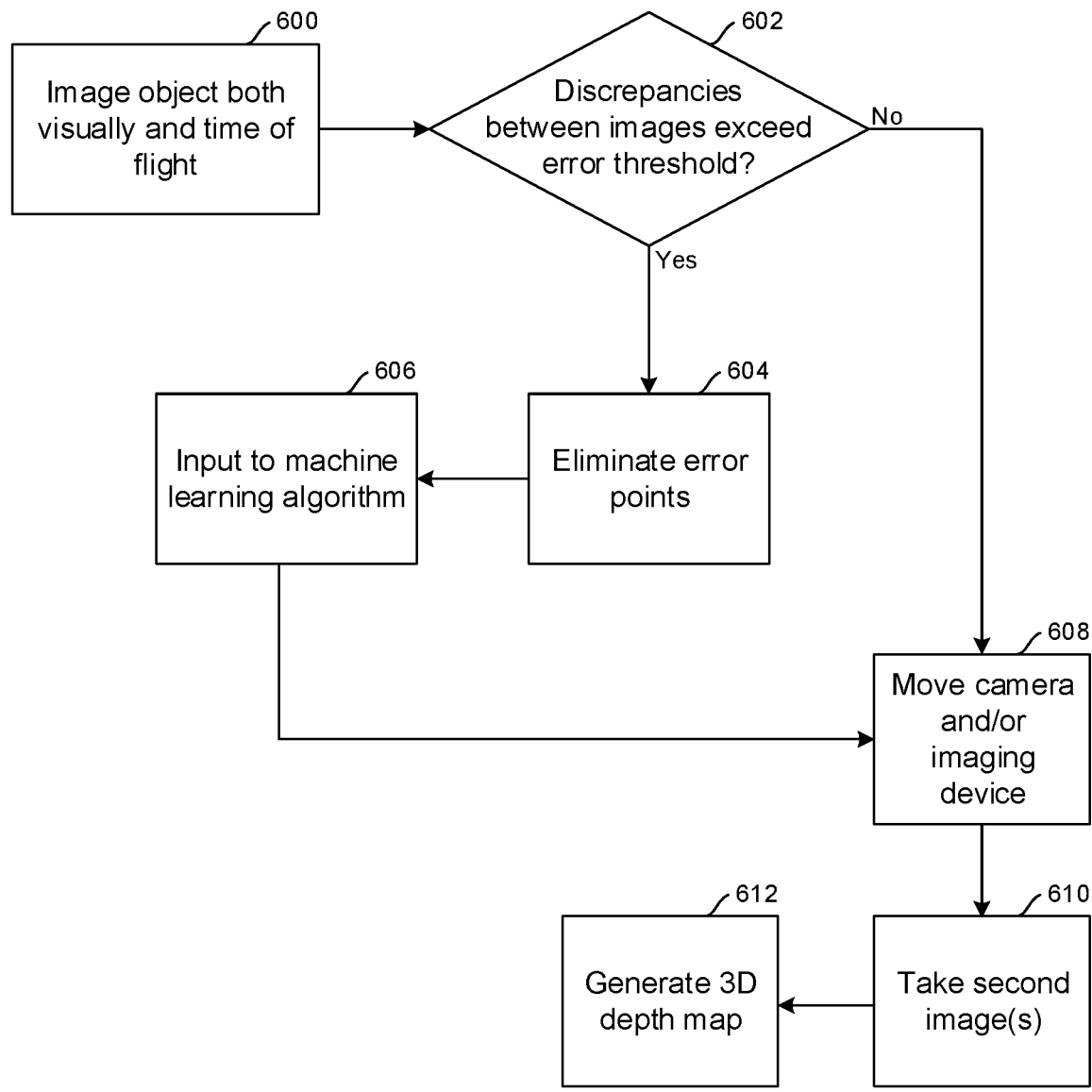
FIG. 6 is a flow chart of example logic consistent with present principles.

FIG. 6 illustrates example logic consistent with present principles. At block 600, an imaging object such as any of those described above may take a 2D camera image and a laser-based TOF image of a target object. The 3D depth map may be compared to the visual image at decision diamond 602 to determine whether any discrepancy (error) between the two images exceeds a threshold. To this end, object recognition may be employed on the visual object to ensure the visual image is of the target object.

The discrepancy might be determined based on, e.g., a comparison of the relative sizes of the images, whether the depth map image presents a portion of the target object that is not presented in the visual image and that portion exceeds a threshold size, whether the depth map image presents a flat surface larger than a threshold, etc.

Responsive to the error in the depth map being greater than the threshold, the logic implicitly assumes that the reflective path that created the discrepancy would be likely due to a wall or ceiling reflection and thus moves to block 604 to remove any excess mapping points from the depth map that produced the determination at decision diamond 602. Similarly, if a reflective path is essentially determined to be relatively shorter it may be from the floor or supporting surface. Moving to block 606, information from block 604 is input to a machine learning algorithm to generate a database or catalog of the range of reflections due to either a wall, or ceiling or floor.

From block 606 or decision diamond 602 if the test there was negative, the logic moves to block 608, at which either the camera(s) on the imaging device are moved relative to the imaging device (in which case the cameras may be supported on the device by, e.g., gimbals) and/or the imaging device itself is moved to another location. In the case in which a large discrepancy is determined the movement may be away from the interfering flat surface, e.g., if multipath was received from a wall to the right of the imaging device as determined by a large discrepancy in the depth image at the right of the depth map, the imaging device may be caused to move further between the wall and the target device (for instance, to the right) and turn its cameras toward the target device and further away from the wall. Or, the imaging device itself may be moved further away from the wall along an axis that places the line of sight to the target device further away from the wall. These are but example motions that may be implemented consistent with present principles. For example, the imaging device may be moved along an axis designed to create the most parallax with the initial image at block 600 in the shortest time.

Similarly, when the error at decision diamond 602 is below the threshold, the imaging device may be moved along an axis designed to create the most parallax with the initial image at block 600 in the shortest time. The movement may be along one or more spatial axes or dimensions.

Proceeding to block 610, once the imaging device and/or camera has been repositioned, an additional TOF image and if desired visual image is generated by the imaging device at block 610. This additional view is used to create an additional 3D depth map at block 612, which is different from the 3D depth map generated in the initial view owing to parallax (the different angles from which the TOF data is generated). Because the object being measured is the same, object recognition may be used to consolidate (e.g., by averaging pixel values) the two views from blocks 600 and 610 and then filter extraneous data from the two views. Or the less noisy of the two views may be used as determined by a noise detection algorithm implemented on both depth map images.

While particular techniques and machines are herein shown and described in detail, it is to be understood that the subject matter which is encompassed by the present invention is limited only by the claims.

What is claimed is:

1. A device comprising:
   at least one processor configured with instructions to:
   receive at least a first camera image of at least one object from a first image generation location;
   receive at least a camera image of the at least one object from a second image generation location, the first and second image generation locations rendering parallax views of the object;
   comparing the first camera image to the second camera image to identify at least one discrepancy;
   use at least one of the first and second camera images to render a three-dimensional (3D) depth map; and
   responsive to identifying a discrepancy, remove at least one element of the 3D depth map, the discrepancy being identified at least in part by one or more of: comparing relative sizes of respective objects in the respective first and second camera images, identifying that at least one object presents a size that exceeds a threshold size, identifying that a flat surface with a size larger than a threshold size is imaged.

2. The device of claim 1, wherein the instructions are executable to identify the discrepancy at least in part by comparing relative sizes of respective objects in the respective first and second camera images.

3. The device of claim 1, wherein the instructions are executable to identify the discrepancy at least in part by identifying that at least one object presents a size that exceeds a threshold size.

4. The device of claim 1, wherein the instructions are executable to establish the second image generation location by translationally moving an imaging object supporting a camera generating the images.

5. The device of claim 1, wherein the instructions are executable to:
   establish the second image generation location by moving a camera relative to an imaging object supporting the camera.

6. The device of claim 1, wherein the instructions are executable to:
   use the first and second camera images to render a three-dimensional (3D) depth map by consolidating the first and second camera images.

7. The device of claim 1, wherein the instructions are executable to:
   use the first and second camera images to render a three-dimensional (3D) depth map by determining which of the first and second camera images exhibits less noise, and using the image exhibiting less noise to establish the 3D depth map.

8. The device of claim 1, wherein the instructions are executable to identify the discrepancy at least in part by identifying that a flat surface with a size larger than a threshold size is imaged.

9. A device comprising:
   at least one processor configured with instructions to:
   receive at least a first camera image of at least one object from a first image generation location;
   receive at least a camera image of the at least one object from a second image generation location; and
   use the first and second camera images to render a three-dimensional (3D) depth map, wherein the instructions are executable to identify whether at least one discrepancy exists between the first and second camera images exceeds a threshold at least in part by executing object recognition on at least a first object in at least one of the camera images, wherein responsive to the discrepancy meeting the threshold, the device implicitly assumes that a light path that created the discrepancy is due to a wall or ceiling reflection and in response removes excess mapping points from the 3D depth map that produced the discrepancy.

10. The device of claim 9, wherein the representations comprise a two-dimensional (2D) images of the object.

11. The device of claim 9, wherein the representations are a three-dimensional (3D) depth map of the object.

12. The device of claim 9, wherein the first image comprises a 2D camera image and the instructions are executable to:
   compare the first image to the 3D depth map to identify a discrepancy; and
   responsive to identifying a discrepancy, remove at least one element of the 3D depth map.

13. The device of claim 9, wherein the instructions are executable to establish the second image generation location by translationally moving an imaging object supporting a camera generating the images.

14. The device of claim 9, wherein the instructions are executable to:
use the first and second camera images to render a three-dimensional (3D) depth map by consolidating the first and second camera images.

15. The device of claim 9, wherein the instructions are executable to:
use the first and second camera images to render a three-dimensional (3D) depth map by determining which of the first and second camera images exhibits less noise, and using the image exhibiting less noise to establish the 3D depth map.

16. A device comprising:
at least one processor configured with instructions to:
receive at least a first camera image of at least one object from a first image generation location;
receive at least a camera image of the at least one object from a second image generation location;
use the first and second camera images to render a three-dimensional (3D) depth map, wherein the instructions are executable to:
establish the second image generation location by translationally moving an imaging object supporting the first camera generating the images away from an interfering flat surface and turning the first camera toward an object.

17. The device of claim 16, wherein the first image comprises a 2D camera image and the instructions are executable to:
compare the first image to the 3D depth map to identify a discrepancy; and
responsive to identifying a discrepancy, remove at least one element of the 3D depth map.

18. The device of claim 16, wherein the instructions are executable to determine which of the first and second camera images exhibits less noise, and use the image exhibiting less noise to establish the 3D depth map.

19. The device of claim 16, wherein the instructions are executable to:
use the first and second camera images to render a three-dimensional (3D) depth map by consolidating the first and second camera images.

20. The device of claim 16, wherein the second image generation location is established by moving a camera relative to an imaging object supporting the camera.

* * * * *